US011221667B1

(12) United States Patent
Ravipati et al.

(10) Patent No.: US 11,221,667 B1
(45) Date of Patent: Jan. 11, 2022

(54) DYNAMIC VOLTAGE SELECTION FOR A SINGLE POWER RAIL IN A MULTI-CORE DOMAIN

(71) Applicant: QUALCOMM Incorporated, San Diego, CA (US)

(72) Inventors: Venkatesh Ravipati, Guntur (IN); Venkata Biswanath Devarasetty, Hyderabad (IN); Nirav Narendra Desai, Hyderabad (IN); Lakshmi Narayana Panuku, Hyderabad (IN); Kumar Kanti Ghosh, San Diego, CA (US); Sharath Kumar Nagilla, Hyderabad (IN); Sravan Kumar Ambapuram, Hyderabad (IN); Shrikanth Shenoy, Bangalore (IN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/944,070

(22) Filed: Jul. 30, 2020

(51) Int. Cl.
*G06F 1/32* (2019.01)
*G06F 1/3296* (2019.01)

(52) U.S. Cl.
CPC .................................. *G06F 1/3296* (2013.01)

(58) Field of Classification Search
CPC .... G06F 1/3228; G06F 1/3243; G06F 1/3287; G06F 1/3293; G06F 1/3296
See application file for complete search history.

(56) References Cited

U.S. PATENT DOCUMENTS

| 8,278,978 | B1* | 10/2012 | Wright | G06F 1/24 |
| | | | | 327/143 |
| 2009/0201082 | A1* | 8/2009 | Smith | G06F 1/3203 |
| | | | | 327/544 |
| 2011/0087900 | A1* | 4/2011 | Lakhanpal | G06F 1/3296 |
| | | | | 713/300 |
| 2012/0054515 | A1* | 3/2012 | Naffziger | G06F 1/3296 |
| | | | | 713/320 |
| 2014/0380070 | A1* | 12/2014 | Hua | G06F 1/3296 |
| | | | | 713/320 |
| 2018/0088647 | A1* | 3/2018 | Suryanarayanan | G06F 1/26 |

* cited by examiner

*Primary Examiner* — Nitin C Patel
(74) *Attorney, Agent, or Firm* — Seyfarth Shaw LLP/Qualcomm Incorporated

(57) ABSTRACT

An apparatus sets an operating voltage of a shared power rail in a multi-core electronic device. The apparatus includes a system-on-chip (SoC) having multiple cores with each core in the SoC configured to report an operating status. The apparatus includes an operating state aggregator configured to receive the operating status reported from each core in the SoC and to select the selected operating voltage based on the operating status from each core. A voltage regulator is in communication with the operating state aggregator and a power management integrated circuit (PMIC). The selected operating voltage is then programmed into the (PMIC) to control the shared power rail.

20 Claims, 5 Drawing Sheets

DYNAMIC VOLTAGE SELECTION FOR A SINGLE POWER RAIL IN A MULTI-CORE DOMAIN

TECHNICAL FIELD

The present disclosure generally relates to methods and systems for power management on a wireless device. More specifically, the present disclosure relates to setting an operating voltage of a power rail in a multi-core domain.

BACKGROUND

Some designs of mobile communications/wireless devices (e.g., smart phones, tablet computers, and laptop computers) include a multi-core domain, such as a system-on-chip (SoC). This multi-core domain may include processing cores that perform specific functions. For example, most SoC devices contain a modem, graphics processor, multimedia processors, infrastructure, and computing processors. These SoC chips are available at varying price points and capabilities.

Wireless device manufacturers may select a full-featured SoC for use in premium devices and may select a less expensive SoC for use in lower priced devices. In the less expensive SoCs, power management may be accomplished using a single power rail. Using only one power rail involves merging the power domains for the modem, infrastructure, multimedia, and computing domains together on a single power rail. On these SoCs, operating voltage may be determined by the application or core that specifies the highest voltage. This highest voltage power management decision incurs a power penalty as not all active cores specify the maximum voltage and even when the highest voltage core is inactive, the remainder of the active cores are running at the now inactive core's maximum voltage. A dynamic voltage selection method would improve power management and save power.

SUMMARY

Aspects of the disclosure provide a method of setting an operating voltage of a shared power rail in a multi-core electronic device. The method begins with identifying a voltage specification for each core in the multi-core electronic device. The voltage specifications corresponding to various operating states may be stored in a look-up table. Next, each core reports an operating state to an operating state aggregator. A selected operating voltage is selected for each core in the multi-core electronic device, based on the reported operating states. The selected operating voltage is then programmed into a voltage regulator in communication with a power management integrated circuit (PMIC) to control the shared power rail.

A further aspect of the disclosure provides an apparatus for setting an operating voltage of a shared power rail in a multi-core electronic device. The apparatus includes a system-on-chip (SoC) having multiple cores with each core in the SoC configured to report an operating status. In addition, the apparatus includes an operating state aggregator configured to receive the reported operating status from each core in the SoC and to select a selected operating voltage based on the reported operating status from each core. The apparatus also includes a voltage regulator in communication with the operating state aggregator and a power management integrated circuit (PMIC) in communication with the voltage regulator.

A still further aspect of the disclosure provides an apparatus for setting an operating voltage of a shared power rail in a multi-core electronic device. The apparatus comprises: means for identifying a voltage specification for each core in the multi-core electronic device; means for receiving from each core in the multi-core electronic device, an operating state; means for selecting, for each core in the multi-core electronic device, a selected operating voltage for the shared power rail based on the reported operating states; and means for programming the selected operating voltage into a voltage regulator in communication with a power management integrated circuit (PMIC) to control the shared power rail.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described, the use of the term "and/or" is intended to represent an "inclusive OR," and the use of the term "or" is intended to represent an "exclusive OR."

Power management on a less expensive system-on-chip (SoC) may be implemented by merging multiple power domains together on a single power rail. This may result in merging modem, computing, and multimedia power into a single voltage domain. At a given operating level, different applications, or cores, specify different voltages depending on their timing closures to achieve the targeted performance. This targeted performance may be based on using a particular frequency, and device performance may suffer if the device is unable to operate at that frequency. Presently, these less expensive SoCs determine the voltage specified at any operating level of the single power rail by determining which core reports the highest voltage. Alternatively, each operating state voltage of the shared power rail is determined by the core reporting the higher voltage. The shared power rail operating state is chosen based on the highest operating level reported among all cores at any point in time. Currently, cores that do not specify higher voltage receive more voltage than needed. Even when the core that specified the higher voltage becomes inactive, the remaining cores continue to operate at the higher voltage. This voltage selection process needlessly produces a power penalty of three to four percent.

The present disclosure describes a method of setting the voltage of an operating state for a power rail in a multi-core domain. In aspects of the disclosure, voltage is increased or decreased depending on which cores are active and what operating state each core specifies. The cores of an SoC are first characterized to identify all of the various voltage specifications for various operating states. This voltage specification per core per operating state information is then utilized by the power management subsystem in conjunction with an operating state accumulator to dynamically adjust voltage level selection depending on which cores are active and what operating level each core is requesting.

Figure 1:
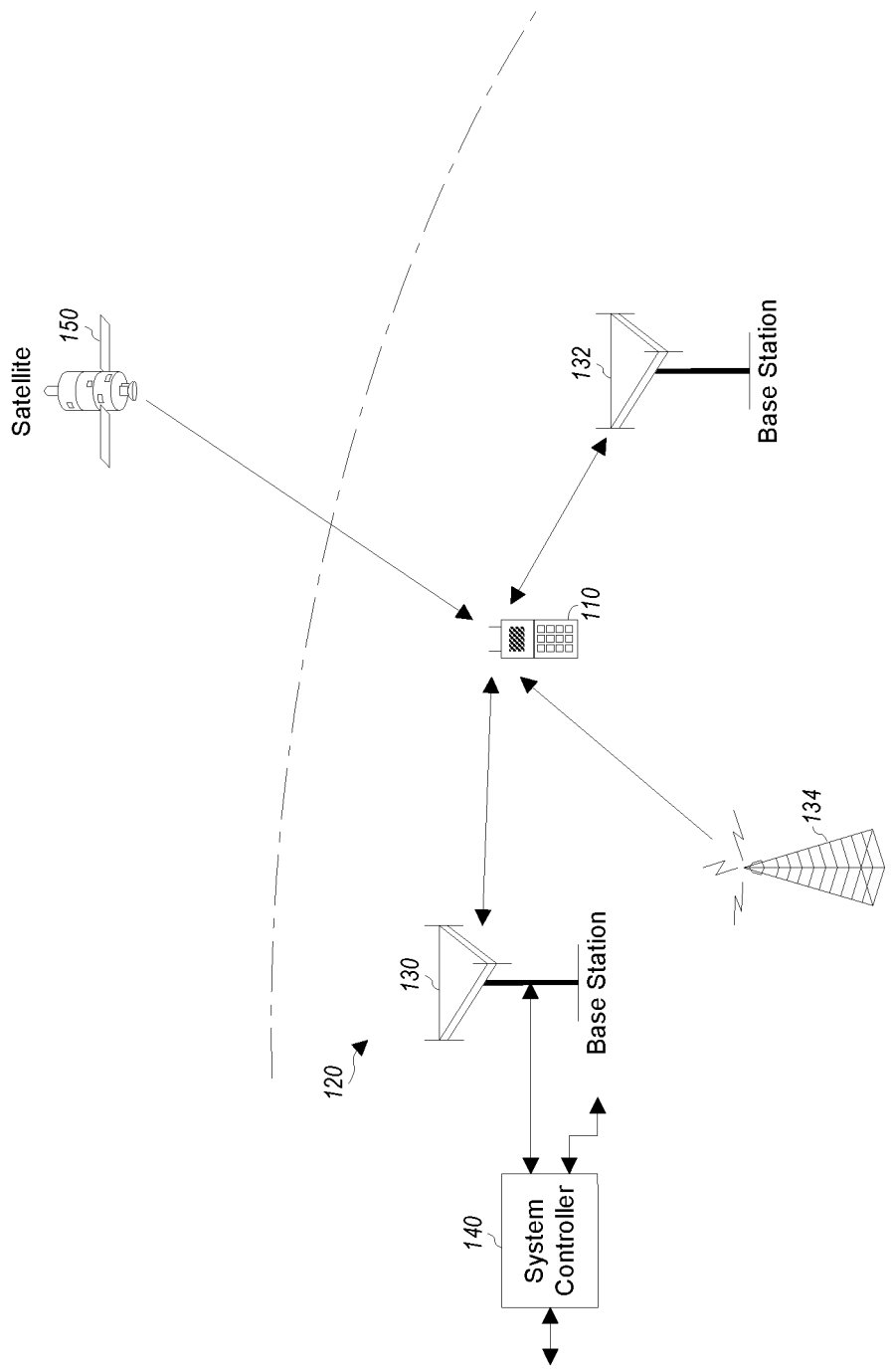
FIG. 1 shows a wireless device communicating with a wireless communications system.

FIG. 1 shows a wireless device 110 that may use the dynamic voltage level setting process for power management. The wireless device 110 communicates with a wireless communications system 120. The wireless communications system 120 may be a 5G NR system, a long term evolution (LTE) system, a code division multiple access (CDMA) system, a global system for mobile communications (GSM) system, a wireless local area network (WLAN) system, millimeter wave (mmWave) technology, or some other wireless system. A CDMA system may implement wideband CDMA (WCDMA), time division synchronous CDMA (TD-SCDMA), CDMA2000, or some other version of CDMA. In a millimeter wave (mmWave) system, multiple antennas are used for beamforming (e.g., in the range of 30 GHz, 60 GHz, etc.). For simplicity, FIG. 1 shows the wireless communications system 120 including two base stations 130 and 132 and one system controller 140. In general, a wireless system may include any number of base stations and any number of network entities.

The wireless device 110 may be referred to as a mobile equipment, a user equipment (UE), a mobile station, a terminal, an access terminal, a subscriber unit, a station, etc. The wireless device 110 may also be a cellular phone, a smartphone, a tablet, a wireless modem, a personal digital assistant (PDA), a handheld device, a laptop computer, a Smartbook, a netbook, a cordless phone, a wireless local loop (WLL) station, a Bluetooth® device, etc. The wireless device 110 may be capable of communicating with the wireless communications system 120. The wireless device 110 may also be capable of receiving signals from broadcast stations (e.g., a broadcast station 134), signals from satellites (e.g., a satellite 150) in one or more global navigation satellite systems (GNSS), etc. The wireless device 110 may support one or more radio technologies for wireless communications, such as 5G NR, LTE, CDMA2000, WCDMA, TD-SCDMA, GSM, 802.11, etc.

Figure 2:
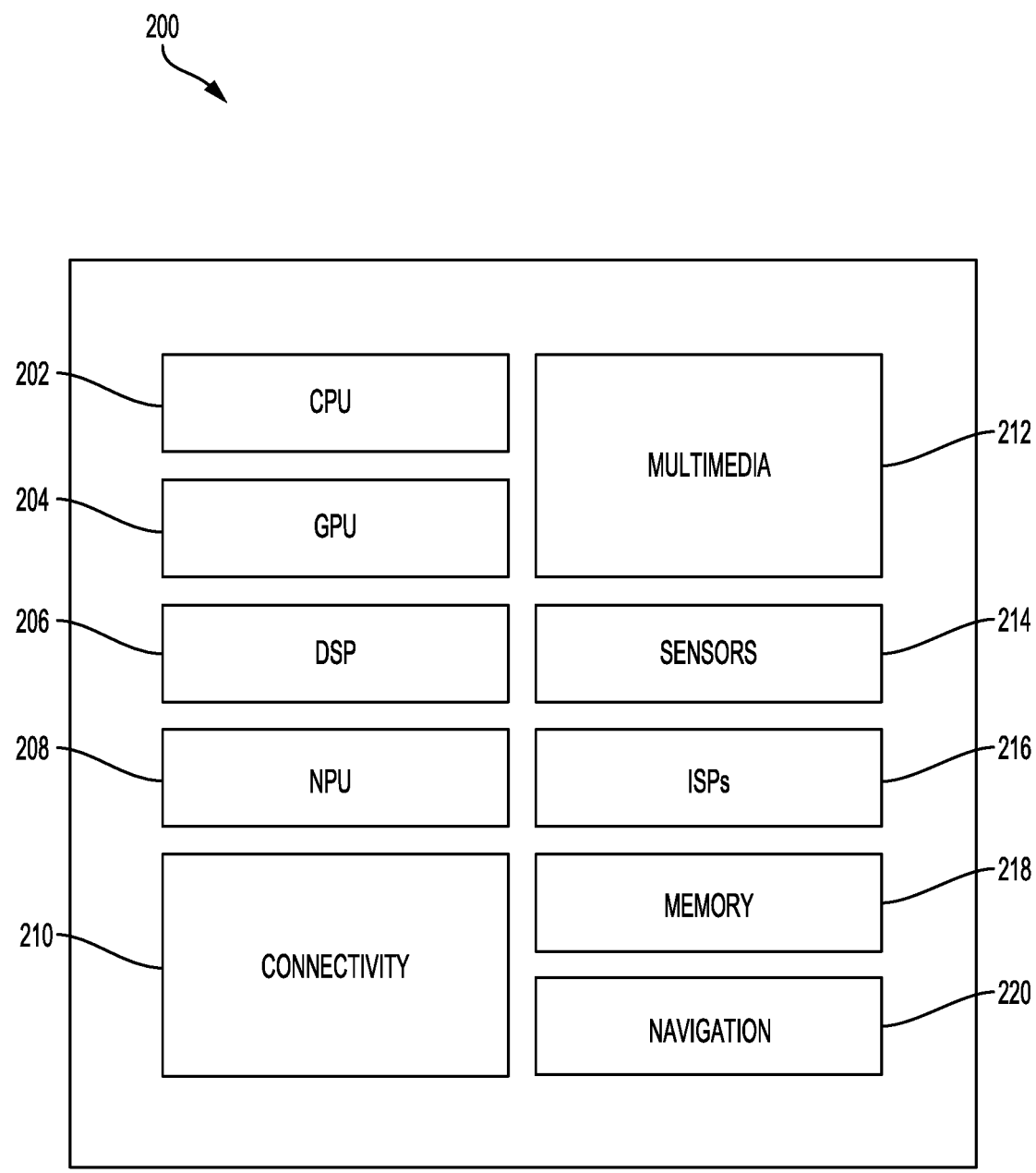
FIG. 2 illustrates an example implementation of a system-on-chip (SoC) having a multi-core domain, in accordance with certain aspects of the present disclosure.

FIG. 2 illustrates an example implementation of a system-on-chip (SoC) 200 having a multi-core domain in accordance with certain aspects of the present disclosure. The SoC 200 includes processing blocks tailored to specific functions, such as a connectivity block 210. The connectivity block 210 may include fifth generation (5G) connectivity, fourth generation long term evolution (4G LTE) connectivity, Wi-Fi connectivity, USB connectivity, Bluetooth® connectivity, Secure Digital (SD) connectivity, and the like.

In this configuration, the SoC 200 includes various processing cores that support multiple operations. For the configuration shown in FIG. 2, the host SoC 100 includes a multi-core central processing unit (CPU) 202, a graphics processor unit (GPU) 204, a digital signal processor (DSP) 206, and a neural processor unit (NPU) 208. The host SoC 200 may also include a sensor processor 214, image signal processors (ISPs) 216, a navigation module 220, which may include a global positioning system, and a memory 218. The multi-core CPU 202, the GPU 204, the DSP 206, the NPU 208, and the multi-media engine 212 support various functions such as video, audio, graphics, gaming, artificial networks, and the like. Each processor core of the multi-core CPU 202 may be a reduced instruction set computing (RISC) machine, an advanced RISC machine (ARM), a microprocessor, or some other type of processor. The NPU 208 may be based on an ARM instruction set.

Figure 3:
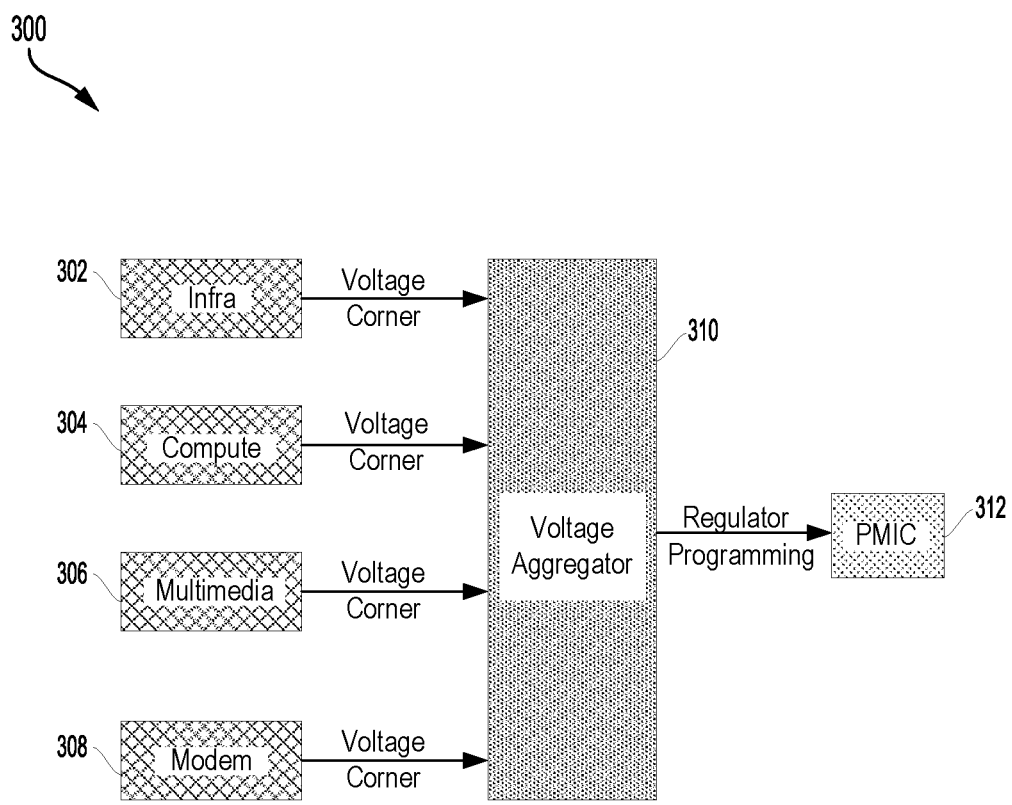
FIG. 3 is a block diagram of exemplary cores in a multi-core domain interacting with the power management system of the system-on-chip (SoC) of FIG. 2, according to aspects of the present disclosure.

FIG. 3 is a block diagram of exemplary cores in a multi-core domain interacting with the power management system of the SoC 200 of FIG. 2, according to aspects of the present disclosure. A multi-core SoC 300 may share a single power rail with each core 302-308 dedicated to a different application. These cores often include an infrastructure core (INFRA) 302, a computing processor core (COMPUTE) 304, a multimedia processor core (MULTIMEDIA) 306, and a modem (MODEM) 308. At any given time, one or more of these cores may be active, depending on the activities a user may be engaging in on the wireless device.

When multiple cores 302-308 are active, each core specifies an operating state to perform operations to wireless device specifications, such as operating at a given frequency. This operating state may vary, with some operations demanding more voltage, such as the modem 308 specifying a higher voltage when in a turbo power mode. A power management system may be implemented as a power management integrated circuit (PMIC) 312. The PMIC 312 directs the voltage rail to provide the power for the active cores. The amount of voltage provided may be dynamically adjusted as described in aspects of this disclosure.

Each core 302-308 reports to a voltage aggregator 310 if the core in question is active or inactive and reports a requested voltage level. An inactive core 302-308 has a zero voltage level. The requested voltage levels may be stored in a look-up table within the voltage aggregator 310. Table 1 is an example of such a table.

TABLE 1

| Operating State | Infra 302 | Compute 304 | Multimedia 306 | Modem 308 | Maximum |
|---|---|---|---|---|---|
| OFF | 0 | 0 | 0 | 0 | 0 |
| Retention | 0.5 | 0.5 | 0.5 | 0.5 | 0.5 |
| Low (SVS) | 0.6 | 0.65 | 0.63 | 0.62 | 0.65 |
| Medium (NOM) | 0.7 | 0.75 | 0.73 | 0.72 | 0.75 |
| High (Turbo) | 0.8 | 0.85 | 0.83 | 0.82 | 0.85 |
| Turbo (Turbo_1) | 0.9 | 0.95 | 0.93 | 0.92 | 0.95 |

The voltage table shown in Table 1 is created during the characterization process for the device and each core 302-308 on the device. The left column of Table 1, denoted operating state, is a listing of potential operating states for each core 302-308. Possible operating states for each core, in this example, include inactive or OFF (0 volts), retention state (e.g., similar to a sleep mode), low supply voltage supervisor (SVS), medium or nominal level (NOM), high (Turbo) level, and Turbo (Turbo L1). Each subsequent column refers to a specific core 302-308 and lists the voltages used at each of the operating states. Table 1 also includes a maximum voltage across all cores in a particular operating state, in the far right column.

The voltage levels for each operating state given in Table 1 are determined by performing characterization studies of the behavior of the multi-core SoC 300 and the behavior of each core 302-308. The results of the characterization study are used to create a voltage level table and are used when dynamically selecting an operating voltage for the multi-core domain.

Aspects of the present disclosure provide for a selected operating voltage to be characterized for each core in its current operating state. The selected operating voltage is less than the maximum voltage across all cores for a particular operating state. In one configuration, the selected operating voltage is an optimal voltage. Using the selected operating voltage provides a power savings when compared with operating at maximum voltage. The voltage level table correlates an appropriate operating voltage for each reported operating state of the core 302-308. This voltage table may be stored in hardware, such as the voltage aggregator 310, or software.

The dynamic voltage selection process begins when each core 302-308 reports a desired operating state. These operating states are reported to the operating state aggregator 310. Each core 302-308 reports an operating state, even if the core is inactive. The operating state aggregator 310 then converts the requested operating state to a voltage value. For example, the MODEM core 308 may be active during a call and may report an operating state of NOM, which is converted to 0.72 volts in the operating state aggregator 310. Once all reports from the cores have been received, the voltage aggregator 310 selects a selected operating voltage across all cores 302-308. These reports are provided when the operating states of cores change.

TABLE 2

| Operating State | Infra 302 | Compute 304 | Multimedia 306 | Modem 308 |
|---|---|---|---|---|
| OFF | 0 | 0 | 0 | 0 |
| Retention | 0.5 | 0.5 | 0.5 | 0.5 |
| Low (SVS) | 0.6 | 0.65 | 0.63 | 0.62 |
| Medium (NOM) | 0.7 | 0.75 | 0.73 | 0.72 |
| High (Turbo) | 0.8 | 0.85 | 0.83 | 0.82 |
| Turbo (Turbo_1) | 0.9 | 0.95 | 0.93 | 0.92 |

In a demonstration case using Table 2, the INFRA core 302 may report an operating state of Low (SVS), the COMPUTE core 304 reports off, the MULTIMEDIA core 306 reports off, and the MODEM core 308 reports NOM, with all of these reports sent to the operating state aggregator 310. The operating state aggregator then converts the INFRA core 302 off to 0.6 volts, the COMPUTE core 304 OFF to 0 volts, the MULTIMEDIA core 306 OFF to 0 volts, and the MODEM core 308 NOM to 0.72 volts. The highest voltage is specified by the MODEM core 308, which will use 0.72 volts. This voltage is selected by the operating state aggregator 310 and passed to the PMIC 312 to ensure that the voltage rail provides 0.72 volts on the power rail.

This selected value is not the maximum voltage of 0.75, shown in Table 1, that is the maximum NOM value across all cores, in this case the value for the COMPUTE core 304. Current selection processes for less expensive multi-core SoC 300 devices would select the maximum NOM value of 0.75 volts. In contrast, aspects of this disclosure define a selected operating voltage that may be selected in place of the maximum voltage value.

Figure 4:
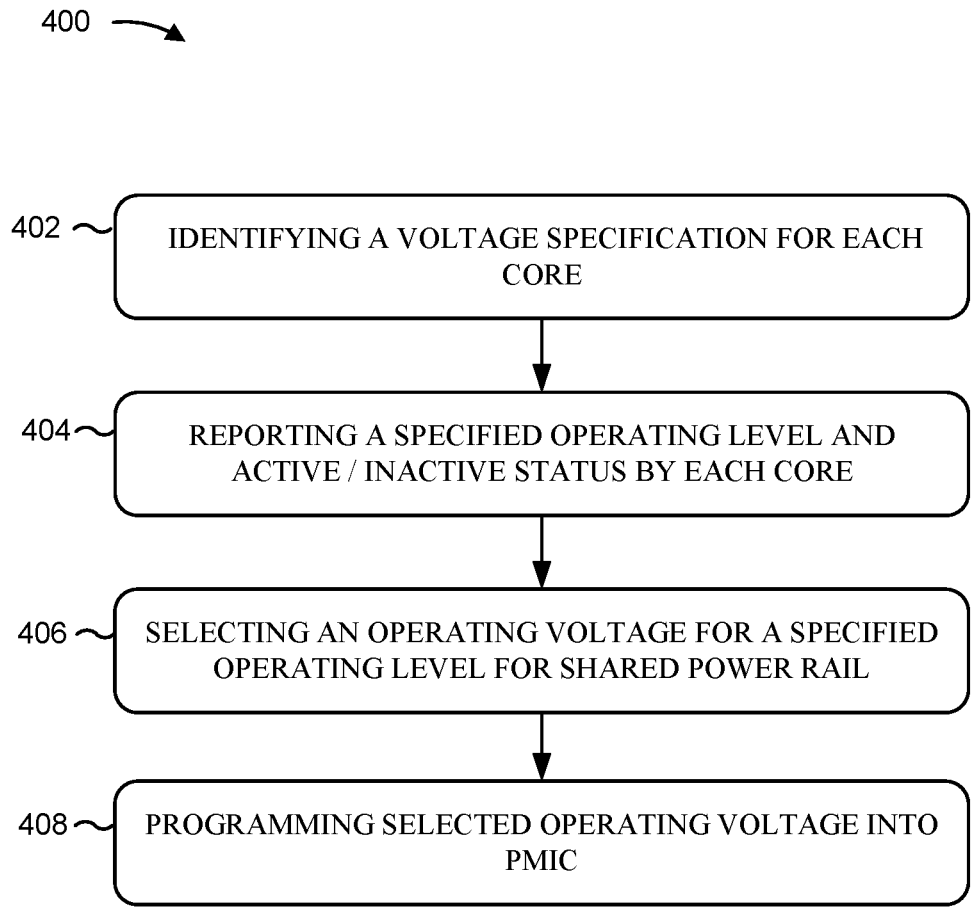
FIG. 4 is a process flow diagram of a process for setting operating voltage of a power rail in a multi-core domain, according to aspects of the present disclosure.

FIG. 4 is a process flow diagram of an exemplary process 400 for setting an operating voltage of a power rail in a multi-core domain, according to aspects of the present disclosure. The process begins in block 402, when a voltage specification is identified for each core in a multi-core electronic device, such as the SoC 300 of FIG. 3. Next, in block 404, each core in the multi-core electronic device reports a specified operating state. As shown in FIG. 3, each core 302-308 reports this information to the operating state aggregator 310. Then in block 406, the operating state aggregator 310 selects the operating voltage specified for each of the reported operating states. The operating state aggregator 310 provides this selected operating voltage value to a voltage regulator, which inputs this value to the PMIC 312, at block 408.

Figure 5:
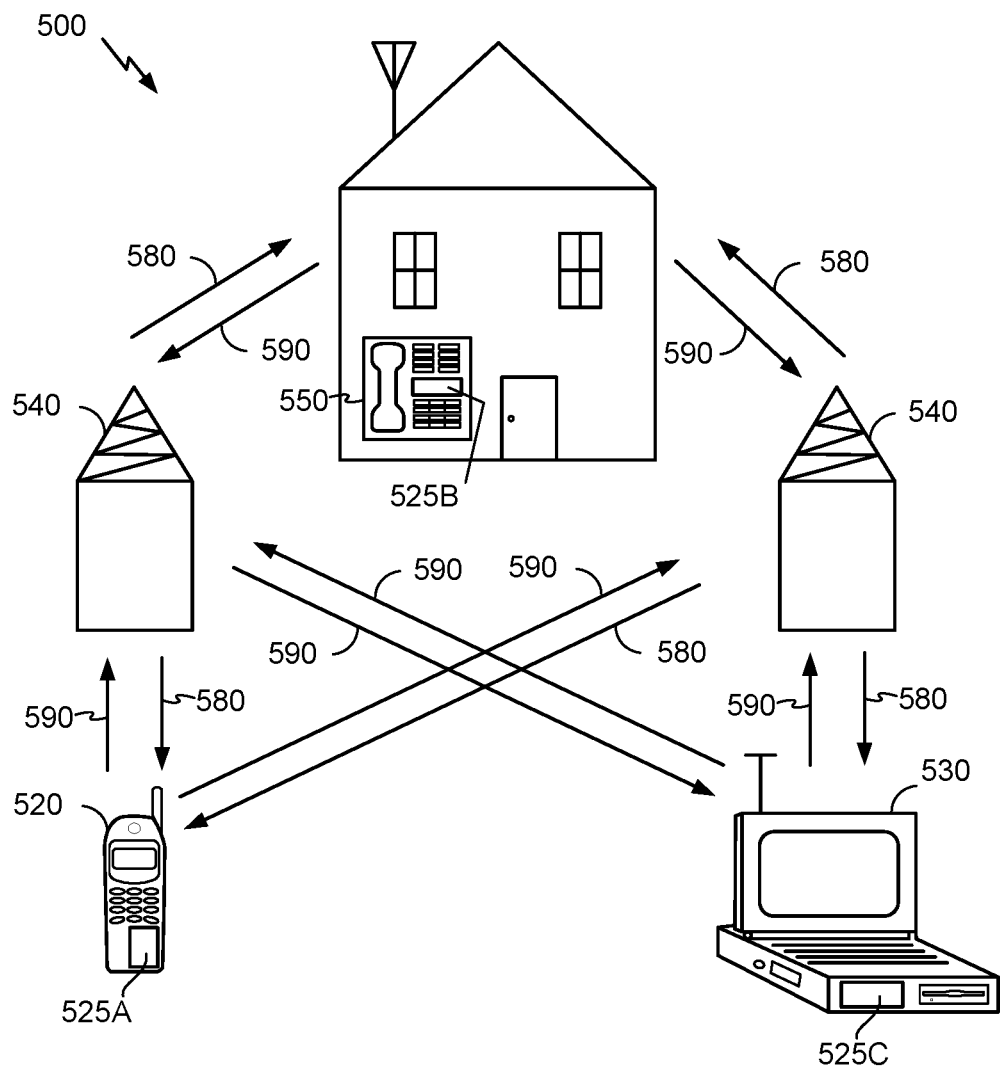
FIG. 5 is a block diagram showing an exemplary wireless communications system in which a configuration of the disclosure may be advantageously employed.

FIG. 5 is a block diagram showing an exemplary wireless communications system in which a configuration of the disclosure may be advantageously employed. For purposes of illustration, FIG. 5 shows three remote units 520, 530, and 550, and two base stations 540. It will be recognized that wireless communications systems may have many more remote units and base stations. Remote units 520, 530, and 550 include IC devices 525A, 525B, and 525C that include the disclosed wireless device, including the described voltage selection. It will be recognized that other devices may also include the disclosed wireless device, such as the base stations, switching devices, and network equipment. FIG. 5 shows forward link signals 580 from the base stations 540 to the remote units 520, 530, and 550, and reverse link signals 590 from the remote units 520, 530, and 550 to base stations 540.

In FIG. 5, the remote unit 520 is shown as a mobile telephone, remote unit 530 is shown as a portable computer, and remote unit 550 is shown as a fixed location remote unit in a wireless local loop system. For example, a remote unit may be a mobile phone, a hand-held personal communications systems (PCS) unit, a portable data unit such as a personal digital assistant (PDA), a GPS enabled device, a navigation device, a set top box, a music player, a video player, an entertainment unit, a fixed location data unit such as meter reading equipment, or other communications device that stores or retrieves data or computer instructions, or combinations thereof. Although FIG. 5 illustrates remote units according to the aspects of the present disclosure, the disclosure is not limited to these exemplary illustrated units. Aspects of the disclosure may be suitably employed in many devices, which include the voltage selection described above.

For a firmware and/or software implementation, the methodologies may be implemented with modules (e.g., procedures, functions, and so on) that perform the functions described. A machine-readable medium tangibly embodying instructions may be used in implementing the methodologies described. For example, software codes may be stored in a memory and executed by a processor unit. Memory may be implemented within the processor unit or external to the processor unit. As used, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer. Disk and disc, as used, include compact disc (CD), laser disc, optical disc, digital versatile disc (DVD), floppy disk and Blu-ray® disc, where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a standard cell circuit having signals indicative of instructions and data. The instructions and data are configured to cause one or more processors to implement the functions outlined in the claims.

The various illustrative logical blocks, modules, and circuits described in connection with the disclosure may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

Although the present disclosure and its advantages have been described in detail, it should be understood that various changes, substitutions, and alterations can be made without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, and composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described may be utilized according to the present disclosure. Accordingly, the appended claims are intended to include within their scope such processes, machines, manufacture, compositions of matter, means, methods, or steps.

What is claimed is:

1. A method of setting an operating voltage of a shared power rail in a multi-core electronic device, comprising:

identifying a voltage specification for each core in the multi-core electronic device;

receiving, at a voltage aggregator, from each core in the multi-core electronic device, an operating state report;

selecting, for each core, a selected operating voltage for the shared power rail based on the reported operating states; and programming the selected operating voltage into a voltage regulator in communication with a power management integrated circuit (PMIC) to control the shared power rail.

2. The method of claim 1, in which the selecting defines the selected operating voltage based on an aggregated operating level voltage.

3. The method of claim 1, further comprising receiving reporting by each core in the multi-core electronic device when each core changes operating state.

4. The method of claim 3, further comprising:

increasing a selected operating voltage level for each active core in the multi-core electronic device when a number of active cores decreases; and decreasing the selected operating voltage level for each active core in the multi-core electronic device when the number of active cores increases.

5. The method of claim 1, further comprising selecting the selected operating voltage among all cores in the multi-core electronic device by an operating state aggregator to store the reported operating states and corresponding voltages for each core in the multi-core electronic device.

6. The method of claim 1, in which the selected operating voltage is less than a maximum voltage.

7. An apparatus for setting an operating voltage of a shared power rail in a multi-core electronic device, comprising:
- a system-on-chip (SoC) having multiple cores with each core in the SoC to report an operating state report;
- an operating state aggregator to receive the operating state report from each core in the SoC and to select a selected operating voltage based on the operating state report from each core;
- a voltage regulator in communication with the operating state aggregator to receive the selected operating voltage; and
- a power management integrated circuit (PMIC) in communication with the voltage regulator to program the selected operating voltage into the voltage regulator to control the shared power rail.

8. The apparatus of claim 7, in which the operating state aggregator store a look-up table.

9. The apparatus of claim 8, in which the look-up table correlates the reported operating status with a voltage value.

10. The apparatus of claim 9, in which the look-up table includes the selected operating voltage.

11. The apparatus of claim 7, in which each core in the SoC is initiates reporting when each core changes operating state.

12. The apparatus of claim 7, in which the operating state aggregator to increase a selected operating voltage level for each active core in the SoC when a number of active cores in the SoC decreases and decreases the selected operating voltage level for each active core when the number of active cores increases.

13. The apparatus of claim 7, in which the operating state aggregator to select a highest operating voltage among all cores in the SoC.

14. An apparatus for setting an operating voltage of a shared power rail in a multi-core electronic device, comprising:
- means for identifying a voltage specification for each core in the multi-core electronic device;
- means for receiving and means for aggregating from each core in the multi-core electronic device, an operating state;
- means for selecting, for each core in the multi-core electronic device, a selected operating voltage for the shared power rail based on the reported operating states; and
- means for programming the selected operating voltage into a voltage regulator in communication with a power management integrated circuit (PMIC) to control the shared power rail.

15. The apparatus of claim 14 further comprising means for initiating reporting by each core in the multi-core electronic device when the core changes operating state.

16. The apparatus of claim 14, further comprising means for increasing a selected operating voltage level for each active core when a number of active cores decreases and means for decreasing the selected operating voltage level for each active core when the number of active cores increases.

17. The apparatus of claim 14 further comprising means for selecting the selected operating voltage among all cores.

18. The apparatus of claim 17, in which the means for selecting the selected operating voltage does not select a maximum voltage.

19. The apparatus of claim 17, in which the means for selecting the selected operating voltage selects a highest operating voltage among all cores.

20. The apparatus of claim 17, in which the means for selecting the selected operating voltage selects from a look-up table.

* * * * *